United States Patent [19]

Spariat et al.

[11] Patent Number: 5,302,044
[45] Date of Patent: Apr. 12, 1994

[54] TEMPORARY MECHANICAL ATTACHMENT DEVICE FLEXIBLE IN BENDING AND DESIGNED TO FRACTURE AT A PREDETERMINED TENSILE LOAD, AND METHOD OF MANUFACTURING IT

[75] Inventors: Jacques Spariat, Saint Medard en Jalles; Jean-Pierre Aubret, Bordeaux; Michel Barriere, Saint Medard en Jalles, all of France

[73] Assignee: Societe Nationale Industrielle et Aerospatiale, France

[21] Appl. No.: 906,950

[22] Filed: Jun. 26, 1992

[30] Foreign Application Priority Data

Jul. 9, 1991 [FR] France ................. 91 08592

[51] Int. Cl.⁵ ............................................. F42B 15/36
[52] U.S. Cl. ................................. 403/291; 403/2; 403/220; 89/1.14; 102/378
[58] Field of Search .................. 403/2, 291, 121, 220, 403/289, 290; 102/377, 378; 248/182; 464/70, 71, 51, 81; 89/1.14

[56] References Cited

U.S. PATENT DOCUMENTS

| | | |
|---|---|---|
| 1,558,576 | 10/1925 | Baumann . |
| 3,575,475 | 4/1971 | Boerner ............... 403/220 X |
| 3,597,938 | 8/1971 | Hellen et al. ........ 403/291 X |
| 3,700,289 | 10/1972 | Bilinski et al. ....... 403/291 X |
| 3,844,137 | 10/1974 | Zugel .................. 403/291 X |
| 3,844,663 | 10/1974 | Prette ................. 403/220 X |
| 4,269,072 | 5/1981 | Duncan ............... 403/291 X |
| 5,115,708 | 5/1992 | Spariat et al. ............ 89/1.14 |
| 5,136,925 | 8/1992 | Spariat et al. ............ 89/1.14 |

FOREIGN PATENT DOCUMENTS

| | | |
|---|---|---|
| 0215725 | 3/1987 | European Pat. Off. . |
| 2271452 | 12/1975 | France . |
| 90138 | 6/1920 | Switzerland . |
| 1633179 | 3/1991 | U.S.S.R. ................ 403/291 |

Primary Examiner—Randolph A. Reese
Assistant Examiner—Harry C. Kim
Attorney, Agent, or Firm—Remy J. VanOphem

[57] ABSTRACT

A unitary construction device for temporarily attaching an object to a support of generally elongate shape along a reference axis, has a first part attached to the support and a second part attached to the object and joined to the first part by a coupling portion flexible in bending. This coupling portion includes a pair of identical axial tangs aligned on a first line transverse to the reference axis and coplanar therewith, flexible parallel to a second line transverse to the reference axis and perpendicular to the first transverse line, and requiring the same energy to fracture in tension parallel to the axis. The coupling portion further includes at least one pair of first feet attached to the first part, one on each side of the first transverse line and extending axially towards the second part, and at least one pair of second feet attached to the second part and extending axially towards the pair of first feet and separated therefrom by the same predetermined axial distance.

25 Claims, 6 Drawing Sheets

TEMPORARY MECHANICAL ATTACHMENT DEVICE FLEXIBLE IN BENDING AND DESIGNED TO FRACTURE AT A PREDETERMINED TENSILE LOAD, AND METHOD OF MANUFACTURING IT

BACKGROUND OF THE INVENTION

1. Field of the Invention

The present invention concerns a temporary mechanical attachment device flexible in bending and designed to fracture at a predetermined tensile load, particularly but not exclusively suitable for temporarily attaching to a support an object intended to be ejected under precise kinematic and kinetic conditions.

It finds an advantageous but by no means exclusive application in spacecraft such as satellites in which a temporary attachment phase is followed by a separation phase, possibly with more or less forcible ejection. It can also find application in various terrestrial vehicles, maritime vehicles (surface vessels and submarines) and airborne vehicles (aircraft of all kinds in which a temporary connection is made that is to be released subsequently, possibly with immediate and precise movement of the object in question, for example to launch it with no external guidance.

A particular application of the invention is to the conducting of scientific experiments in the upper atmosphere of the Earth or to exploring the planets of the solar system using an automatic probe. It can be used, for example, to secure and then release or eject a storage vessel containing a chemical substance to be used as a tracer to study winds or magnetic fields: a storage vessel of this kind can be ejected from an artificial platform such as a sounding rocket or an interplanetary probe.

2. Description of the Prior Art

Various mechanisms are already known for providing temporary attachment of this kind followed by separation and more or less forcible ejection, in practice for achieving clean separation between the object and its support.

The following documents are particularly noteworthy in this respect: U.S. Pat. No. 4,554,905, WO-82/02527, U.S. Pat. Nos. 3,887,150, 2,888,294, 3,196,745, 3,597,919, 4,002,120, 4,187,759, FR-2,616,856 and FR-2,616,857.

The temporary attachment of the object to its support is in practice designed to be as stiff as possible, both in traction and in bending.

Temporary couplings relying on pyrotechnic separation are known: explosive bolts, explosive cutters and pyrotechnic release systems which retract an abutment member. Apart from the fact that they sometimes require a large number of parts, these various solutions always assume release commands separate from the ejection commands. Also, separation can disturb ejection and compromise its accuracy.

Also known are fragile couplings which are fractured by the ejection itself. This is the case with shear pins which are disposed transversely to the direction of ejection and anchored at their respective ends into the object and into the support. However, the shear pin technique has the following drawbacks.

It requires an extremely accurate fit between the moving parts; there is a risk of unwanted friction between the parts after the pin fractures; there is an additional part (the pin) whose two portions must be held in place after it fractures and which may scrape against the surface of the opposite other part; it is difficult to release the object, which is in practice retained by a number of pins, without unbalancing the system (through rotational (tilting) movement in particular).

This solution is complex because it is necessary to manufacture a number of parts and to assemble them accurately. Finally, it is not always reliable.

It has been found that a stiff coupling between the object and its support is not always advantageous and that, to enable ejection in any accurately defined direction with an accurately defined amplitude, it may be advantageous to make the coupling flexible but stiff in traction to enable the orientation of the object relative to the support before and after ejection to be defined only by the rod which applies the ejection thrust.

U.S. Pat. No. 5,136,925 in the name of the assignee hereof issued Aug. 11, 1992, discloses a simple and reliable temporary attachment device enabling relative movement of an object relative to its support in bending, which has a fragile area designed to fracture at a predetermined tensile load and advantageously adapted to center the object at least locally with reference to a possible ejection direction.

This patent discloses a device for temporarily attaching an object to a support having a body designed to be fixed to the support and including an annular end portion fixed to the object and joined to the body by a coupling. The coupling between the annular end portion of the receptacle fixed to the object and the body is flexible and fragile. An intermediate ring is joined to the annular end area and to the body by respective pairs of flexible axial tangs on respective diameters at 90° to each other, the tangs of each pair being identical.

The central axial opening of the device enables sliding movement of the ejector rod, if any. Alternatively, it can enable the passage of electrical conductors (which are protected by it) or any other kind of connecting or transmission tube or cable that must be protected against relative tilting bending movement of the object and support.

According to preferred features of U.S. Pat. No. 5,136,925, the tangs of each pair have the same tensile strength and the tangs of one pair have a lower tensile strength than the tangs of the other pair. The tangs of each pair have the same tensile strength and tangs joining the intermediate ring to the annular end area have a lower tensile strength than the tangs joining the intermediate ring to the receptacle body. The tangs of each pair have the same characteristics in bending about the respective diameters, and the tangs of each pair have the same thickness transversely to the respective diameters and the same height parallel to the predetermined direction. The tangs of each pair have the same radial dimension and the tangs of one pair have a smaller radial dimension than the tangs of the other pair.

The intermediate ring and the tangs are an integral part of the body and include the annular end portion.

The body is hollow and contains an ejector rod having a rear portion designed to be subjected to ejection pressure and a front end designed to abut against the object.

The device further includes a spring member compressed axially between a flange inside the body and a bearing surface on the rear portion of the ejector rod to prestress the fragile coupling in traction; in particular, this prevents the attachment of the annular end portion to the object from loosening.

The annular end portion of the receptacle includes an externally screwthreaded portion cooperating with an internal screwthread formed at the mouth of the recess in the object, and the device also has a centering portion adapted to enter the recess with slight clearance.

An object of the present invention is to improve the performance of the temporary mechanical attachment device described in U.S. Pat. No. 5,136,925 by simplifying its construction and minimizing the risk of unwanted deterioration, notably in bending, but also and advantageously in torsion or even in shear, in service or at the time of ejection.

To be more precise, a first object of the invention is to provide a simple and reliable way of delimiting axial movement in bending (or even in torsion or, better still, in shear) of the device during handling, during storage or in service so as to protect the tangs from any excessive loading likely to degrade their fracture characteristics under tensile loading in particular or during possible ejection so as to limit relative movement in bending during such ejection to prevent any risk of binding/impact during movement of the piston within the device (for a piston 15 mm in diameter the sliding clearance in the attachment device may be only 0.5 mm). The invention is thus directed to improving the reliability of ejection, if any.

It has been found that in practice a small amount of relative movement in bending is sufficient to benefit from the flexibility in bending required in the aforementioned patent.

From the manufacturing point of view, another object of the invention, possibly in conjunction with the first mentioned object, is to reduce the precautions to be observed when machining the tangs and in particular to avoid the need for additional structures for stiffening the blank in bending during the machining of the tangs in the latter so as to minimize the risk of damage caused in particular by vibration during machining, so as to enable industrial scale manufacture at moderate cost.

SUMMARY OF THE INVENTION

In one aspect, the present invention resides in a unitary construction device for temporarily attaching an object to a support, of generally elongate shape along a reference axis, which has a first part adapted to be attached to the support and a second part adapted to be attached to the object and joined to the first part by a coupling portion flexible in bending which has a pair of identical axial tangs aligned on a first line transverse to the reference axis and coplanar therewith, flexible parallel to a second line transverse to the reference axis and perpendicular to the first transverse line, and requiring the same energy to fracture in tension parallel to the axis. The coupling portion further has at least one pair of first feet attached to the first part, one on each side of the first transverse line and extending axially towards the second part, and at least one pair of second feet attached to the second part and extending axially towards the pair of first feet and separated therefrom by the same predetermined axial distance.

According to preferred features of the invention the coupling portion has another pair of identical axial tangs aligned on a third transverse line parallel to the second line from which it is offset axially, flexible parallel to the first transverse line and requiring the same energy to fracture in tension. The pair of axial tangs aligned on the first transverse line and the other pair of axial tangs are offset in the axial direction and joined together by an intermediate part, the device having at least one other pair of first feet attached to the first part, one on each side of the other pair of axial tangs and extending axially towards the second part and at least one other pair of second feet attached to the second part and extending axially towards the other pair of first feet and separated therefrom by the same other predetermined axial distance.

Each pair of axial tangs is associated with a pair of first feet and a pair of second feet and the pairs of first and second feet are offset from the axial tangs of the pair by 90° about the reference axis.

All of the tangs and all of the first and second feet are the same distance from the reference axis.

At least one of the first feet and that of the second feet axially facing it constitute respective facing surfaces inclined to the reference axis and separated by a predetermined distance whereby the surfaces form abutments in torsion in at least one direction about the reference axis.

The pair of first feet and the pair of second feet each have at least one pair of inclined surfaces having opposite directions of inclination relative to the axis, the pairs of inclined surfaces facing each other at the same predetermined distance so as to form abutments in torsion in both directions about the reference axis.

The inclinations in opposite directions have the same absolute value.

Each first foot and second foot constitute a pair of inclined surfaces inclined in opposite directions.

The inclined surfaces have an absolute value of inclination relative to the reference axis between 10° and 20°.

At least one of the first feet and the second feet axially facing it constitute axial projections offset at least approximately parallel to the associated pair of axial tangs and joined by an elongate transverse secondary tang at least approximately parallel to the associated pair of axial tangs.

The pair of first feet and the pair of second feet each include two axial projections, the axial projections of the first feet being joined to the axial projections of respective second feet by two elongate secondary tangs, one on each side of the associated pair of axial tangs and in the same direction at least approximately parallel to the associated pair of axial tangs whereby when the device is loaded in torsion about the reference axis one of the secondary tangs is loaded in tension and the other of the secondary tangs is loaded in compression.

The first and second parts are substantially cylindrical and hollow.

In a second aspect, the present invention resides in a method of manufacturing a unitary construction device for temporarily attaching an object to a support, generally elongate along a reference axis and having a first part adapted to be attached to the support, a second part adapted to be attached to the object and joined to the first part by a coupling portion flexible in bending having a pair of identical axial tangs aligned on a first line transverse to the reference axis and coplanar therewith, flexible parallel to a second line transverse to the reference axis and perpendicular to the first transverse line and requiring the same energy to fracture in tension parallel to the axis. According to the method of the invention, in a first stage, a blank is produced with a first portion having the geometry required of the first part, a second portion having the geometry required of the second part and an intermediate portion joining the first and second blank portions and having a first pair of main axial columns aligned on the first line and at least a second pair of stiffener axial columns, one on each side of the first line. In a second stage, the pair of axial tangs is machined into the first pair of axial columns. In a third stage, cuts are machined into the second pair of axial columns at least in part transverse to the reference axis so as to form therein a pair of first feet attached to the first part, one on each side of the first transverse line and extending axially towards the second part and at least one pair of second feet attached to the second part and extending axially towards the pair of first feet from which it is separated by the same predetermined axial distance.

According to preferred features of the invention, in the first stage, another pair of main axial columns is formed in the intermediate portion offset axially and angularly relative to the pair of main axial columns and a second pair of stiffener axial columns separated from the pair of main axial columns and from the second pair of axial columns by an intermediate area. In the second stage identical axial tangs are machined into the other pair of main columns requiring the same energy to fracture in tension. In the third stage, cuts are machined into the other second pair of stiffener axial columns so as to form therein another pair of first feet attached to the first part, one on each side of the other pair of axial tangs and extending axially towards the second part, and at least one other pair of second feet attached to the second part and extending axially towards the other pair of first feet from which it is separated by a same other predetermined axial distance.

There is a single second pair of axial stiffener columns for each pair of main axial columns.

All the tangs and all the first and second feet are the same distance from the reference axis.

A single cut is machined in each column of the second pair, the cuts being straight, transverse and extending through all the cross section of the columns of the second pair.

Each cut passes completely through the columns of the second pair and constitutes a transverse part and at least one part inclined relative to the axis so as to form torsion abutment surfaces.

Each cut constitutes a transverse part between two parts inclined to the reference axis in opposite directions so as to form torsion abutment surfaces for each direction of torsion about a reference axis.

Each inclined part is inclined to the reference axis at an angle between 10° and 20°.

Two transverse cuts parallel to the line joining the associated axial tang are machined through part only of each column of the second pair and oriented in opposite directions so as to form in the column a transverse tang coupling the first and second feet.

Each cut is formed by spark erosion, preferably using a wire, and the blank is substantially cylindrical and axially hollow.

Objects, features and advantages of the invention will emerge from the following description given by way of non-limiting example with reference to the appended drawings.

DETAILED DESCRIPTION OF THE INVENTION

Figure 1:
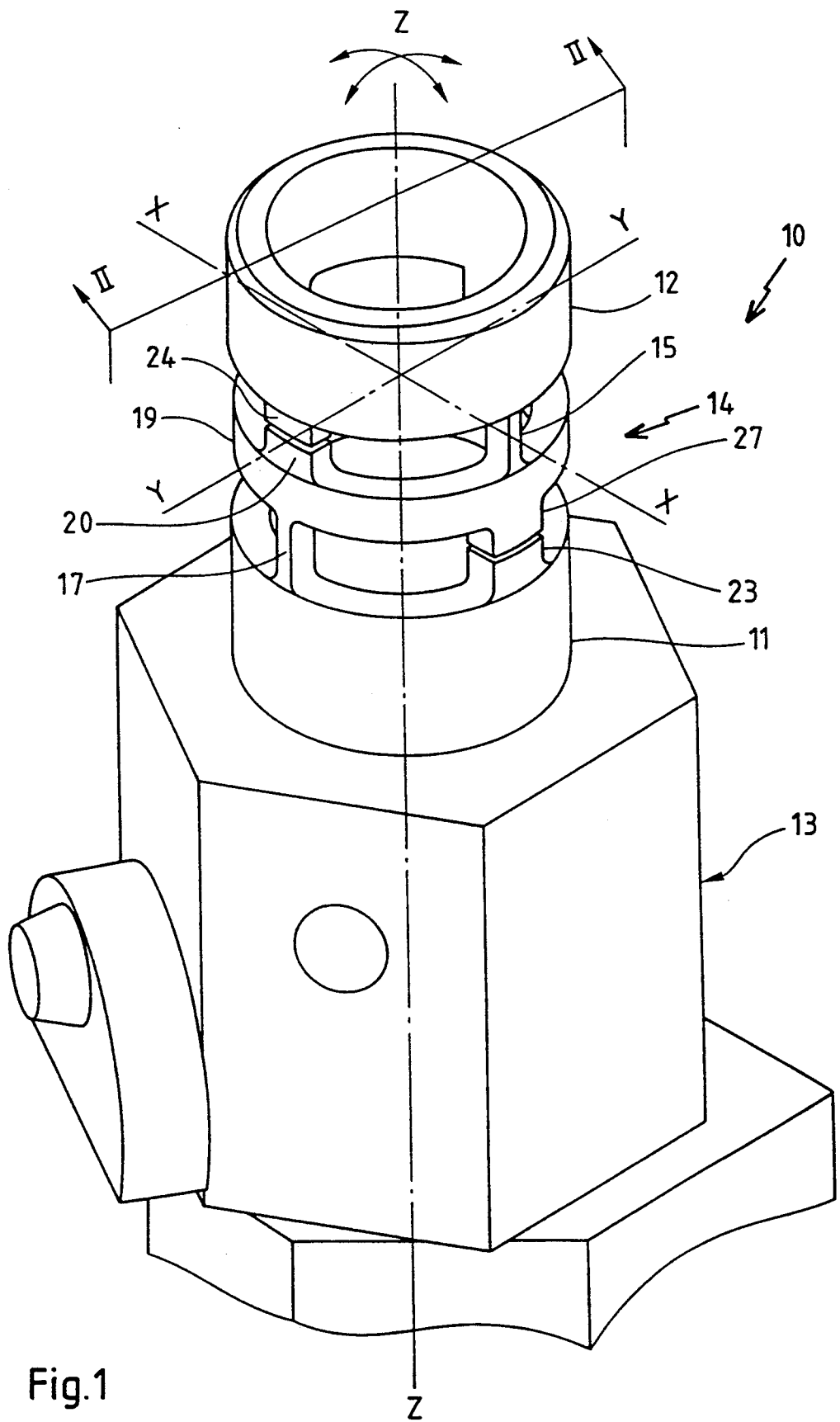
FIG. 1 is a perspective view of a first embodiment of an attachment device in accordance with the invention.
Figure 2:
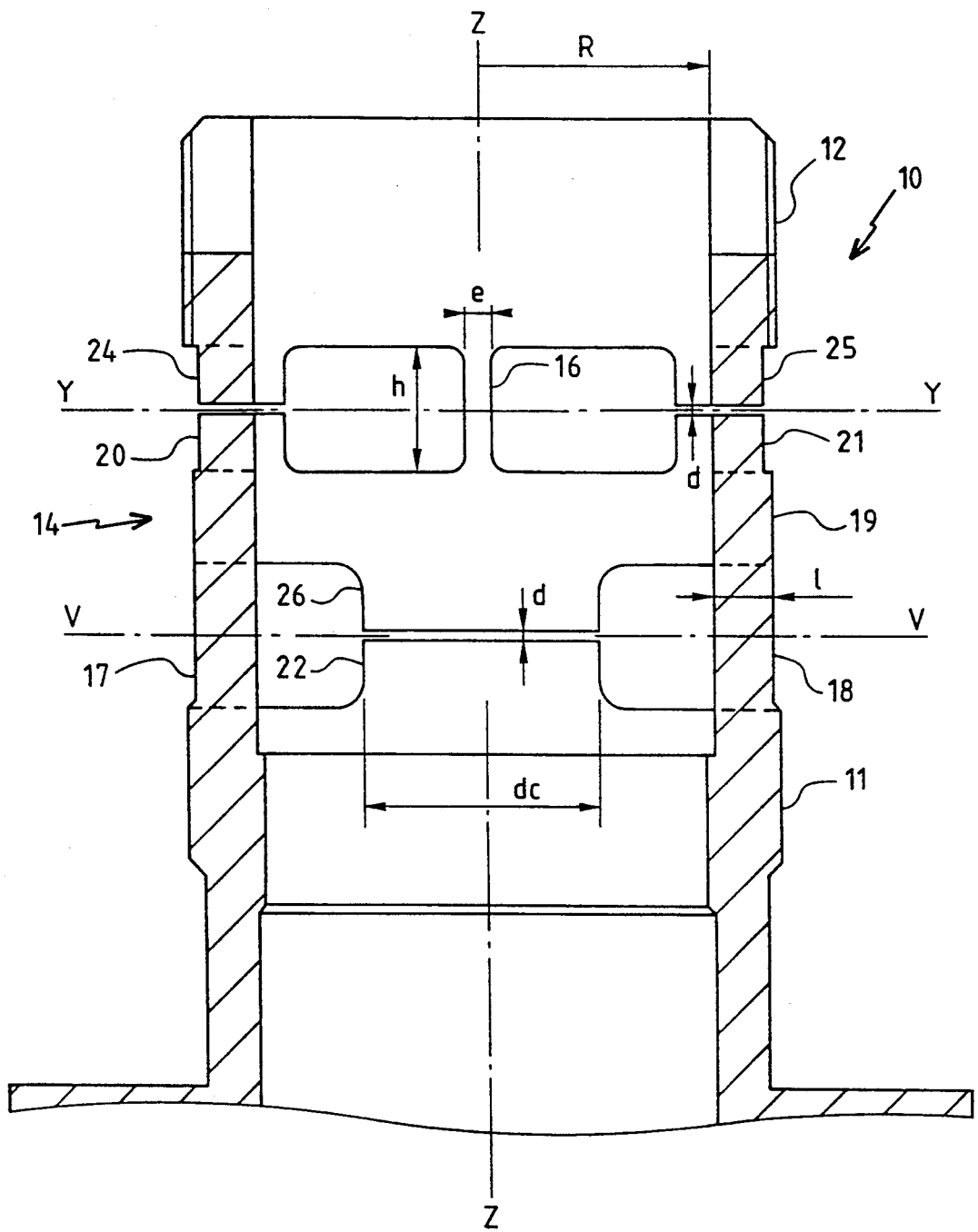
FIG. 2 is a view of the device in axial cross section on the line II—II in FIG. 1.

FIGS. 1 and 2 show a first embodiment of a temporary attachment device 10 in accordance with the invention which is of generally elongate shape along a reference axis Z—Z. The device is of unitary construction and has a cylindrical first part 11 adapted to be affixed to a support (not shown) and an annular second part 12 adapted to be fixed to an object (not shown) that is to be temporarily attached to the support until its controlled separation from the support, for example by means of an ejector piston adapted to slide axially inside the first and second parts 11 and 12 and, before it is deployed, accommodated in a body 13 joined to the first part. As the body and the ejector means do not form any part of the present invention they will not be described in detail.

The second part 12 is in practice externally screwthreaded so that it can be screwed to the object.

The first and second parts 11 and 12 are joined together by an intermediate coupling portion 14 which is flexible in bending and adapted to fracture at a predetermined tensile load.

The intermediate coupling portion 14 has at least one pair of identical axial tangs 15 and 16 aligned on a first line X—X which is transverse to the reference axis Z—Z and coplanar therewith. The tangs 15 and 16 are flexible parallel to a second line Y—Y which is transverse to the reference axis and perpendicular to the line X—X.

The tangs have the same geometry, i.e. thickness e, height h radial width l and the same surface area and require the same energy to fracture in tension.

To enable bending in any direction transverse to the reference axis Z—Z the intermediate coupling portion 14 preferably includes another pair of identical axial tangs 17 and 18 aligned on a third transverse line V—V parallel to the line Y—Y but offset axially thereto and flexible parallel to the first line X—X. The tangs 17 and 18 have the same cross section area and the same geometry; they require the same energy to fracture in tension, different from the energy required for the tangs 15 and 16 to fracture, so that when the final tensile load is applied only one pair of tangs break.

The tangs 15 and 16 and the tangs 17 and 18 are joined by an intermediate part 19 in the form of an annular ring.

The temporary attachment device 10 further includes for each pair of axial tangs 15 and 16 or 17 and 18, a pair of first feet 20 and 21, respectively 22 and 23, attached to the first part, one on either side of the line X—X or V—V joining the associated axial tangs, and extending axially towards the second part plus a pair of second feet 24 and 25, respectively 26 and 27, attached to the second part and axially facing the first feet 20 and 21

(respectively 22 and 23) from which they are separated by a predetermined axial distance d which is advantageously the same (with no loading applied to the device) for all the first/second feet pairs, delimiting relative displacement in bending of the axial tangs.

It will be understood that the various tangs and feet mentioned above are at the same distance R from the axis Z—Z because the tangs and the feet are formed from a common cylindrical blank. In an alternative arrangement that is not shown, the tangs on the one hand and the feet on the other hand could be differently spaced from the axis Z—Z.

Figure 7:
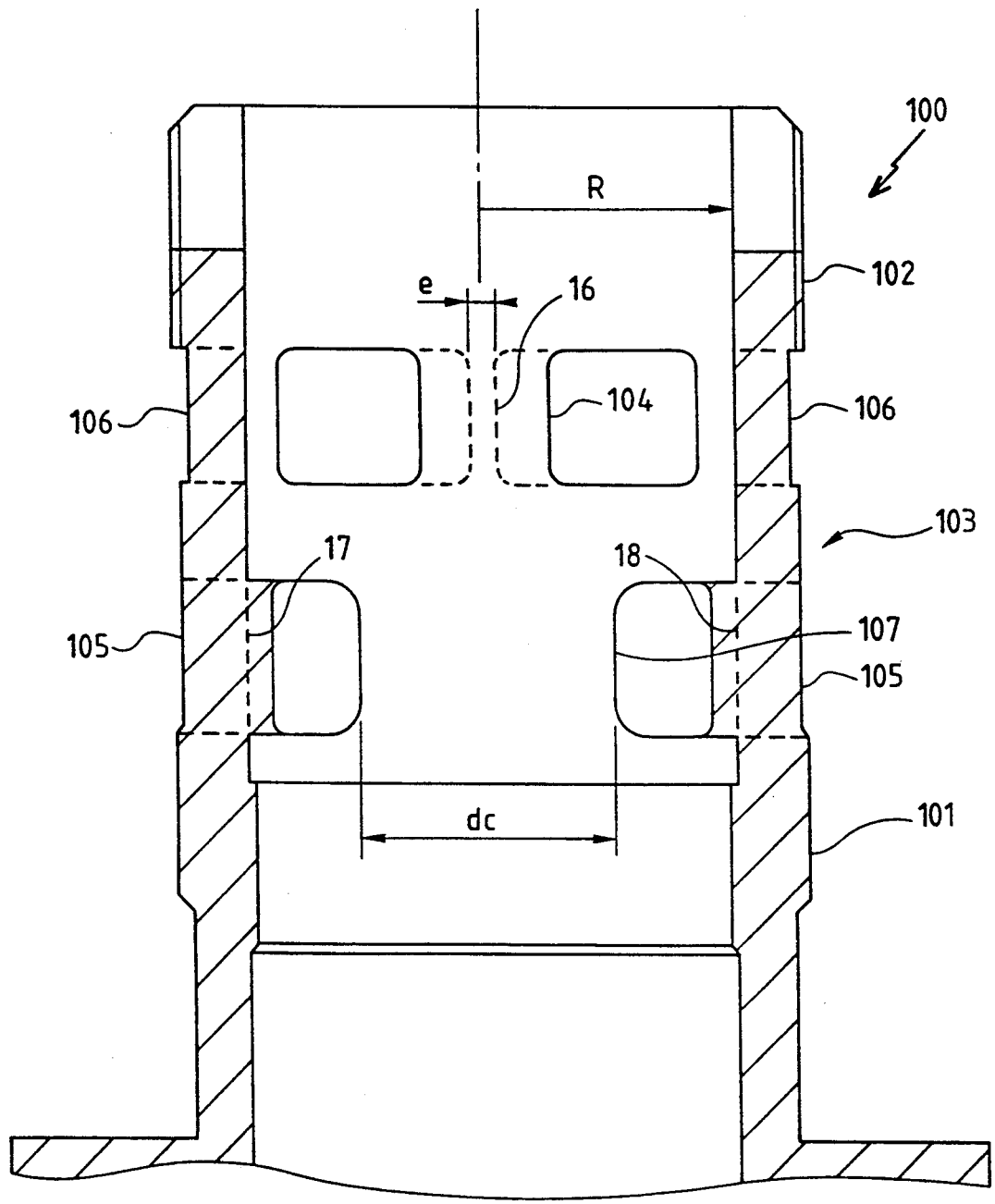
FIG. 7 a view similar to that of FIG. 2 showing a blank in an intermediate stage of manufacture of the device shown in FIGS. 1 and 2.

The manufacturing cycle for the temporary attachment device 10 includes the following stages:

a) In a first stage (FIG. 7) a blank 100 is produced having a first portion 101 with the geometry required of the first part 11, a second portion 102 having the geometry required of the second part 12 and an intermediate portion 103 joining the portions 101 and 102 and having two pairs of main axial columns 104 (respectively 105) at the future locations of the pairs of axial tangs 15 and 16 (respectively 17 and 18) and two pairs of stiffener columns 106 and 107 at the future locations of the first and second feet. Naturally, the main axial columns may optionally be completely isolated or even clearly differentiated from the other stiffener columns.

b) In a second stage, as shown by the dashed lines in FIG. 7, the axial tangs 15 through 18 are obtained by machining the main axial columns; the machining can be carried out by milling because the columns 106 and 107 have sufficient cross section to render the blank sufficiently stiff in bending to withstand the milling vibration; the dimensions of the tangs are then checked.

c) In a third stage a cut is machined through the columns 106 and 107, preferably by spark erosion using a wire, so as to separate the first and second feet, the thickness of this cut being the required distance of axial relative movement between the first and second feet.

It will be understood that the facility to machine the tangs by milling considerably facilitates manufacture; what is more, milling produces much stronger axial tangs than would be the case with spark erosion machining which in practice would be possible only if the columns 106 and 107 were absent.

The spark erosion machining of the cuts in the stiffening columns does not introduce any tension loads into the device and enables fine cuts LV to be made (0.3 to 0.4 mm wide, for example).

In the example shown the stiffener columns 106 and 107 have a circumferential dimension (denoted dc in FIG. 2) in the same order of magnitude as the inside radius R of the original blank 100; in practice the distance dc is preferably at least four times the thickness e of the tangs. In the foregoing description it is assumed that the tangs and columns have the same radial dimension, which is naturally not obligatory; where this is not so, the aforementioned ratio applies to the cross sections of the tangs and the columns.

To give a numerical example, for an inside diameter of 15 mm and a radial width l of 2 mm, the dimension dc has the value 8 mm and the thickness of the tang has the value 1.2 mm.

Figure 3:
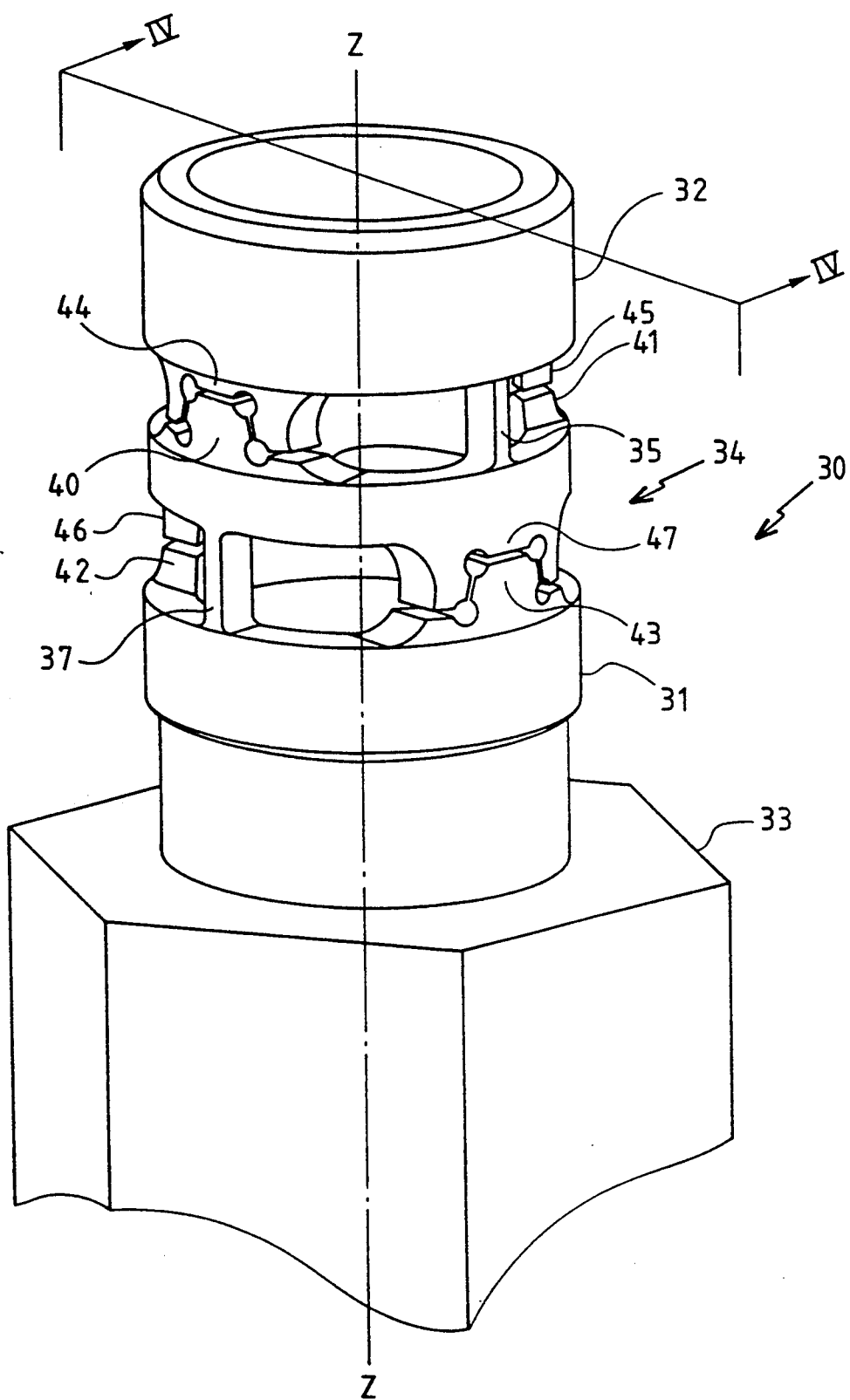
FIG. 3 is a perspective view of a second embodiment of an attachment device in accordance with the invention.
Figure 4:
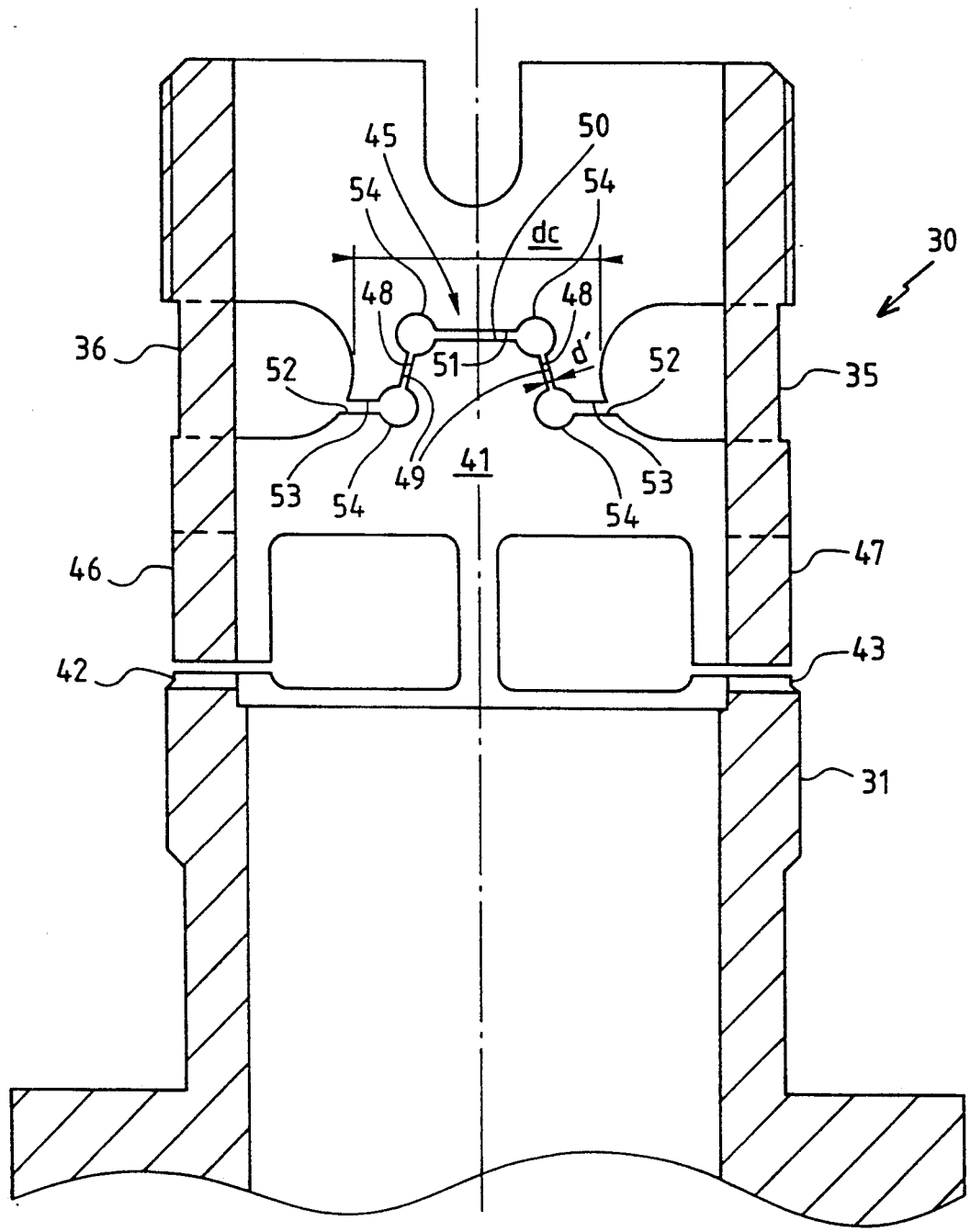
FIG. 4 is a view of the device in axial cross section on the line IV—IV in FIG. 3.

FIGS. 3 and 4 show a variant implementation of the device 10 from FIGS. 1 and 2. Component parts of this second device 30 analogous to those of FIGS. 1 and 2 are identified by the same reference number increased by 20.

The device 30 differs from the device 10 shown in FIGS. 1 and 2 in the shape of the first and second feet 40 through 47: these feet have transverse axial bearing surfaces and additional surfaces 48 and 49 inclined at approximately 15° to the Z—Z axis, facing each other and spaced from each other by a predetermined distance d'.

The combination of the first and second feet advantageously includes at least two pairs of such inclined surfaces 48 and 49 oriented in opposite directions so as to be able conjointly to limit relative movement in torsion of the tangs in either direction.

In the preferred embodiment shown in FIGS. 3 and 4 each foot includes two surfaces 48 or 49 oriented in opposite directions, one on each side of the axial bearing surfaces. Of course, the orientation of these inclined surfaces is determined to allow unrestricted axial separation of the feet. The figure of 15° mentioned above for the inclination of these surfaces would seem to be a good compromise enabling good resistance to torsion, with no unwanted ramp effect, combined with easy axial releasing of the feet.

In more detail, the first feet have a convex profile inserted with clearance in the concave profile of the second feet (or vice versa) with the inclined surfaces of the concave profile converging inside the foot comprising it.

Finally, it will be realized that each inclined surface is itself bracketed circumferentially by two transverse axial bearing surfaces. There is, therefore, for each pair of feet a central transverse surface 50 or 51 and two lateral transverse surfaces 52 or 53.

The cross section plane of FIG. 4 passes through the lateral surfaces.

In the example shown, the central transverse surface spans half the dimension dc and the lateral transverse surfaces each span slightly less than one quarter of this dimension.

Concave radial grooves 54 are in practice formed at each change of inclination of the facing surfaces; they reduce the risk of excessive stress concentration at the merging of these surfaces. The grooves are obtained, for example, by drilling the stiffener columns of the blank before they are separated to form the first and second feet, these bores facilitating the changes of direction and changing the wire during the machining of the cuts by spark erosion.

To give a numerical example, the distance between the central transverse surfaces 50 and 51 when no loading is applied to the device is 0.3 mm, that of the lateral transverse surfaces 52 and 53 is 0.4 mm (and therefore greater: these are clearances) and the separation between the surfaces inclined at 15° is equal to 0.1 mm, which represents an axial relative movement exceeding 0.3 mm, in other words greater than the separation of the central surfaces. The central surfaces, therefore, provide axial abutment.

Figure 5:
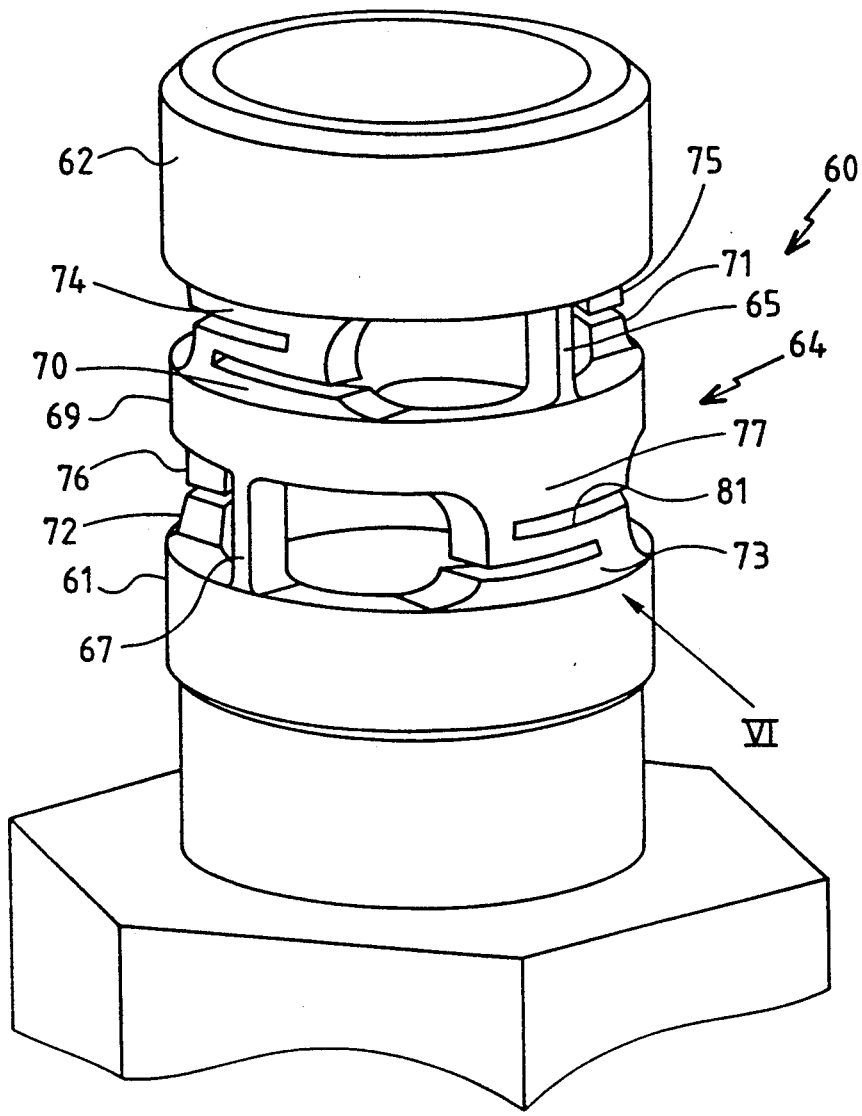
FIG. 5 is a perspective view of a third embodiment of an attachment device in accordance with the invention.
Figure 6:
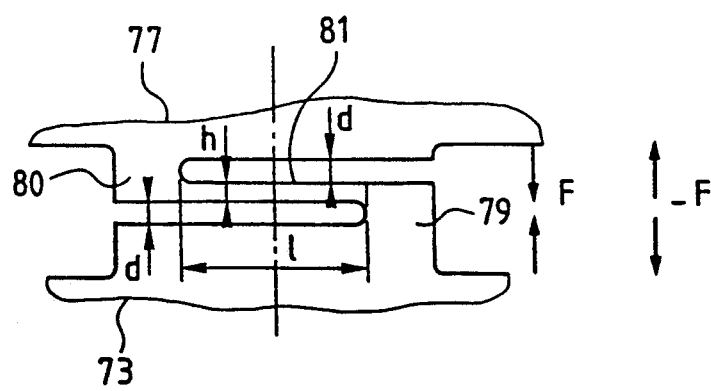
FIG. 6 is a view to a larger scale of the detail indicated in FIG. 5 by the arrow VI.

FIGS. 5 and 6 show a third temporary attachment device 60 whose component parts similar to those of the device 10 are identified by the same reference number increased by 50.

The novel feature of the third device is that the first and second feet are not completely separated but joined by circumferentially elongate transverse tangs which resist torsion in tension (or even in compression). Their general shape is that of the letter Z (or a reversed letter Z).

As seen more clearly in FIG. 6, each pair of facing feet (73 and 77, for example) has two axial projections 79 and 80 offset circumferentially and each at the required axial distance d from the facing foot to provide the required relative movement in bending, these projections being joined by a tang 81 designed to fracture in bending when the connecting area 64 breaks at the predetermined load.

It should be noted that the presence of the transverse tangs makes very little difference to the energy required to fracture the tangs; assuming identical axial and transverse tangs (apart from their orientation) the additional energy required to fracture the transverse tangs is approximately (h/6l) times the energy required to fracture the axial tangs where h is the thickness (parallel to the bending direction) and l is the length; in other words, the additional energy is very small.

A pair of axial tangs is preferably associated with a pair of transverse tangs having the same orientation (forming a Z-shape and a reversed Z-shape as seen from the exterior of the device) so that, irrespective of the direction of torsion, one of the tangs resists in tension, so protecting the other tang against compression loads which could degrade the bending properties of the tangs.

Of course, the transverse tangs must in practice be sized such that they deform elastically (and not plastically) on relative movement in bending (F or −F in FIG. 6) up to axial abutment engagement of the feet, and so that they withstand predictable tension/compression loads.

It goes without saying that the foregoing description has been given by way of non-limiting example only and that numerous variants may be put forward by one skilled in the art without departing from the scope of the invention.

We claim:

1. A device for temporarily attaching an object to a support comprising:
   a body mounted to said support, said body having a longitudinal axis;
   an annular end portion attached to said body and secured to said object; and
   a coupling located between said body and said annular end portion for securing said annular end portion to said body, said coupling comprising:
   an intermediate ring having a central axis;
   at least two axial tangs circumferentially spaced apart and extending longitudinally between said annular end portion and said intermediate ring, each of said at least two axial tangs having one end attached to said annular end portion and an opposite end attached to said intermediate ring;
   at least two body portions circumferentially spaced apart and extending longitudinally between said annular end portion and said intermediate ring, each of said at least two body portions being alternately spaced with each one of said at least two axial tangs such that each one of said at least two body portions are spaced between said at least two axial tangs, each said at least two body portions having one end attached to said annular end portion and an opposite end attached to said intermediate ring; and
   each of said at least two body portions further comprising two foot portions, one of said two foot portions having one end attached to said annular end portion and an opposite end extending in a direction opposite to said one end, the other of said two foot portions having one end attached to said intermediate ring and an opposite end extending in a direction opposite to said one end such that the opposite ends of each of said two foot portions are adjacent each other whereby when a force is applied to said object in a direction transverse to said central axis said opposite end of each of said two foot portions cooperate with one another to limit the relative bending movement of said coupling.

2. The device according to claim 1 further comprising a cylinder member located between said body and said intermediate ring; and a second at least two axial tangs extending longitudinally between said intermediate ring and said cylinder member, said second at least two axial tangs being circumferentially offset from said at least two axial tangs.

3. The device according to claim 2 further comprising a second at least two body portions circumferentially spaced apart and extending longitudinally between said cylinder member and said intermediate ring, each one of said second at least two body portions being alternately spaced with each one of said at least two axial tangs such that each one of said second at least two body portions are spaced between said second at least two axial tangs; each of said second at least two body portions having one end attached to said cylinder member and an opposite end attached to said intermediate ring.

4. The device according to claim 3 wherein each pair of said at least two and said second at least two axial tangs is associated with a pair of body portions and each associated tang and foot pair is circumferentially offset by about 90°.

5. The device according to claim 1 wherein said at least two tangs and said least two body portions are radially displaced a predetermined distance.

6. The device according to claim 1 wherein said one of said two foot portions and said other of said two foot portions have a first pair of complementary inclined facing surfaces separated a predetermined distance whereby said first pair of complementary inclined facing surfaces form abutments to carry torsional loads.

7. The device according to claim 6 wherein said one of said two foot portions and said other of said two foot portions have a second pair of complementary inclined facing surfaces separated a predetermined distance whereby said second pair of complementary inclined facing surfaces form abutments to carry torsional loads in both directions.

8. The device according to claim 7 wherein said first and second pair of complementary inclined facing surfaces of said two foot portions are inclined relative to a horizontal reference axis between about 10° and about 20°.

9. The device according to claim 1 wherein said one of said two foot portions and said other of said two foot portions are offset circumferentially and said device further comprises a secondary elongate tang having a first end connected to said one of said two foot portions and a second end connected to said other of said two foot portions whereby when said device is located in torsion said secondary elongate tang is loaded.

10. The device according to claim 1 wherein said annular end portion and said intermediate ring each are cylindrical and have a hollow portion therein.

11. The device according to claim 1 wherein each of said at least two axial tangs has a first predetermined cross-sectional shape whereby when a force is applied to said object in a direction transverse to said central axis the elastic bending characteristics of said at least two axial tangs will be substantially the same.

12. The device according to claim 1 wherein said coupling is integrally formed with said body and said annular end portion so as to define a generally cylindrical member.

13. The device according to claim 1 further comprising an external helical thread disposed on the peripheral surface of said annular end portion and a complementary internal thread disposed on an internal diameter of said object, said external helical thread cooperating with said internal thread formed in said object to secure said object to said annular end portion.

14. The device according to claim 13 further comprising a centering member extending longitudinally through said body and an elongate recess longitudinally disposed within said object, said centering member being slidably engaged with said elongate recess.

15. The device according to claim 1 wherein said body is hollow.

16. The device according to claim 1 further comprising at least two additional axial tangs circumferentially spaced apart and extending longitudinally between said intermediate ring and said body, each of said at least two additional axial tangs having one end attached to said intermediate ring and an opposite end attached to said body.

17. The device according to claim 16 wherein each member of said at least two additional tangs has a first predetermined cross-sectional shape whereby when a force is applied to said object in a direction transverse to said central axis the elastic ending characteristics of each said member of said at least two additional axial tangs will be substantially the same.

18. The device according to claim 16 wherein members within each of said at least two axial tangs and said at least two additional axial tangs have substantially equal tensile strength properties.

19. The device according to claim 18 wherein said at least two axial tangs have a lower tensile strength than said at least two additional axial tangs.

20. The device according to claim 1 wherein said at least two axial tangs are mounted between said annular end portion and said intermediate ring diametrically opposed about a first axis substantially transverse to said longitudinal axis.

21. The device according to claim 20 further comprising at least two additional axial tangs circumferentially spaced apart and extending longitudinally between said intermediate ring and said body, each of said two additional axial tangs having one end attached to said intermediate ring and an opposite end attached to said body.

22. The device according to claim 21 wherein said members within each of said at least two axial tangs and each of said at least two additional axial tangs have substantially equal radial dimensions, and wherein said members of said at least two axial tangs have a smaller radial dimension than said members of said at least two additional axial tangs.

23. The device according to claim 21 wherein said at least two additional axial tangs are mounted between said intermediate ring and said body diametrically opposed about a second axis, said second axis being transverse to said longitudinal axis and substantially perpendicular to said first axis.

24. The device according to claim 23 wherein each of said at least two axial tangs and each of said at least two additional axial tangs have substantially equal thicknesses in a direction orthogonal to said longitudinal axis and wherein each of said at least two axial tangs and each of said at least two additional axial tangs have substantially equal heights in a direction parallel to said longitudinal axis.

25. The device according to claim 23 wherein said members within each of said at least two axial tangs and said at least two additional axial tangs have substantially equal tensile strength properties.

* * * * *

UNITED STATES PATENT AND TRADEMARK OFFICE
CERTIFICATE OF CORRECTION

PATENT NO. : 5,302,044
DATED : April 12, 1994
INVENTOR(S) : Jacques Spariat, Jean-Pierre Aubret and Michel Barriere It is certified that error appears in the above-indentified patent and that said Letters Patent is hereby corrected as shown below:

```
Column 6, line 45, after "h" insert ---- , ----.

Column 7, line 48, delete ---- LV ----.

Column 10, line 64, delete "located" insert ---- loaded ----.

Column 11, line 38, delete "ending" insert ---- bending ----.
```

Signed and Sealed this

Sixteenth Day of August, 1994

*Attest:*

BRUCE LEHMAN

*Attesting Officer*     *Commissioner of Patents and Trademarks*